United States Patent [19]
Neft

[11] Patent Number: 4,697,230
[45] Date of Patent: Sep. 29, 1987

[54] AC POWER SUPPLIED STATIC SWITCHING APPARATUS HAVING ENERGY RECOVERY CAPABILITY

[75] Inventor: Charles L. Neft, Murrysville Boro, Pa.

[73] Assignee: Westinghouse Electric Corp., Pittsburgh, Pa.

[21] Appl. No.: 877,605

[22] Filed: Jun. 23, 1986

[51] Int. Cl.$^4$ ............................................. H02M 5/275
[52] U.S. Cl. ....................................... 363/163; 363/10; 361/88
[58] Field of Search ..................... 363/10, 56, 158–165; 318/807, 808; 361/88, 90, 91

[56] References Cited

U.S. PATENT DOCUMENTS

| | | | |
|---|---|---|---|
| 4,276,588 | 6/1981 | McLyman et al. | 363/56 |
| 4,438,486 | 3/1984 | Ferraro | 363/56 |
| 4,555,754 | 11/1985 | Hennevin | 363/56 X |
| 4,607,322 | 8/1986 | Henderson | 363/56 |

Primary Examiner—Patrick R. Salce
Assistant Examiner—Emanuel Todd Voeltz
Attorney, Agent, or Firm—C. M. Lorin

[57] ABSTRACT

A three-phase matrix converter including switches having snubber circuits associated thereto, is provided with a common voltage clamp capacitor for limiting the voltage applied to the snubber capacitor, and energy is accumulated in the clamp capacitor which is controllably dissipated, in particular by providing energy to auxiliary elements of the overall system.

5 Claims, 8 Drawing Figures

AC POWER SUPPLIED STATIC SWITCHING APPARATUS HAVING ENERGY RECOVERY CAPABILITY

CROSS-REFERENCED PATENT APPLICATIONS

Reference is made to the following patent applications:

(1) Ser. No. 829,739, filed Feb. 14, 1986, entitled "Hidden DC-Link AC/AC Converter Using Bilateral Power Switches and Motor Drive Embodying the Same."

(2) Ser. No. 829,740, filed Feb. 14, 1986, entitled "Matrix Converter Control System and AC Motor Drive Embodying the Same."

BACKGROUND OF THE INVENTION

The invention relates to direct AC-AC converters, i.e., frequency changers such as are being controlled to change AC electric power from one frequency to another through a single stage of conversion. This is in contrast to a two-stage system involving an intermediate DC link connected to an inverter. Direct AC to AC conversion offers significant advantages over the DC link approach to frequency changing. As shown in the prior art, the direct AC to AC converter may be an unrestricted frequency changer (UFC) like shown in U.S. Pat. Nos. 3,470,477 and 3,493,838 of Gyugyi, or a matrix converter as disclosed in the cross-referenced copending patent applications. Generally, the direct AC/AC converter may look as a matrix converter owing to the fact that a plurality of bilateral switches look like a grid of switches mounted between an AC input and an AC output which are controlled as a "matrix" to effect a desired voltage wave reconstruction. Therefore, the direct AC/AC converter will also be referred to hereinafter as a matrix-type converter, without any limitation being implied by this wording.

Under control in the matrix to connect input lines to output lines directly according to a predetermined control scheme, the bilateral switches are alternately switched ON and OFF under a phase line voltage. The switch may consist of a bipolar transistor, a gate turn-off thyristor (GTO), or a force-commutated thyristor surrounded by bridge rectifiers and auxiliary components. Whatever the type of switching device, commutation requires the provision of circuitry involving a capacitor, and components like diodes and resistors to facilitate the transition during commutation from one state to the next, through pulse shaping, for loss reduction or stress minimization. Such a circuit is known as a "snubber".

Energy accumulated in the capacity of the snubber and dissipated through the associated resistor is a loss which is not at all negligible, considering the high repetitive rate of the commutation steps. Also, the requirement to maximize the snubber action upon the associated switch calls for an increased capacitance, whereas the high rate of switching desirable goes the other way.

SUMMARY OF THE INVENTION

The present invention proposes to maximize the snubber effect of a snubber circuit associated to an AC power supplied static switching apparatus, by providing means for limiting the voltage applied to the snubber capacitor and means for recovering the energy accumulated in excess of such voltage limit.

The invention provides for a controlled dissipation of such accumulated energy and also provides for auxiliary means for converting such recovered energy and applying it, as an auxiliary voltage source, to the static switching apparatus itself.

DETAILED DESCRIPTION OF THE INVENTION

Figure 1:
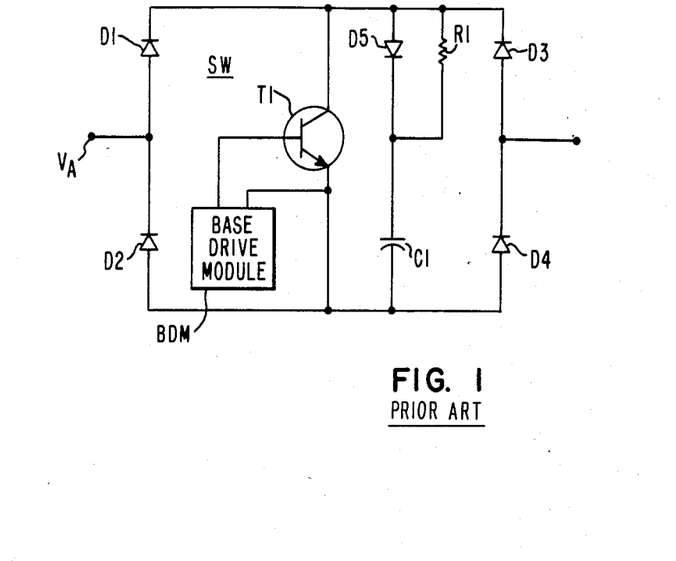
FIG. 1 is illustrative of a bilateral switch of the prior art as can be used in a direct AC/AC converter.

FIG. 1 shows a bilateral switch sw of the prior art centered about a bipolar transistor $\overline{T1}$ having the usual base drive module BDM connected for control between base electrode and emitter electrode, and inserted in one phase line of an AC/AC converter, typically under voltage $V_A$ for such phase. Diodes D1, D2 at one side, D3, D4 at the other side, form a bridge having the transistor T1 across its diagonal. The conventional snubber circuit includes a capacitor C1 in series with a diode D5 which is parallel to transistor T1, and with a resistor R1 connected in parallel to diode D5. Conduction of transistor T1 will be at a time along a path including D1, T1 and D4, at another time along D3, T1 and D2, as generally known. At turn-off of transistor T1 the effect of the load inductance can result in large voltage transients on the transistor T1. The capacitor has to be just large enough to successfully limit the dv/dt and prevent overvoltage on the switching device (a transistor T1 in the illustration) as required. The energy accumulted in capacitor C1 is dissipated in the resistor R1 and through the transistor, when the latter is turned ON. The snubber circuit is used favorably for three reasons: First, it provides pulse shaping, whereby switching loss in the transistor is reduced at turn-OFF. Secondly, it causes a reduced dv/dt upon the device. This is an important consideration for a GTO device. Thirdly, it reduces the peak voltage on the device. These advantages, however, are not without disadvantages. For instance, the turn-ON loss of the switching device is increased. Also, (since a switch like SW in FIG. 1 is provided for each phase $V_A$, $V_B$, $V_C$ as shown by SWA, SWB, SWE in FIG. 2) when the next switch to conduct is turned ON, a resonant circuit consisting of the snubber capacitor C1, and the circuit's parasitic inductance in series with the line supply could, under certain conditions, result in excessive voltage (up to twice the peak line-to-line voltage) upon capacitor C1, hence the switching device, transistor T1 in this case. A typical such path could be in referring to FIG. 2, within switch SWA as defined by $V_A$, DA1, D5, C1, D4, then, within SWB along D3, nodal point JB1, transistor T2, nodal point JB2, DB2 and $V_B$ (the inductance being distributed throughout the circuit).

At any rate, the energy accumulated in capacitor C1 is dissipated in the resistor R1 and the transistor T1. This is a loss of power, which depends on the operating frequency of the switch, whereas, a higher operating frequency is often desirable in order to satisfy performance goals.

Figure 2:
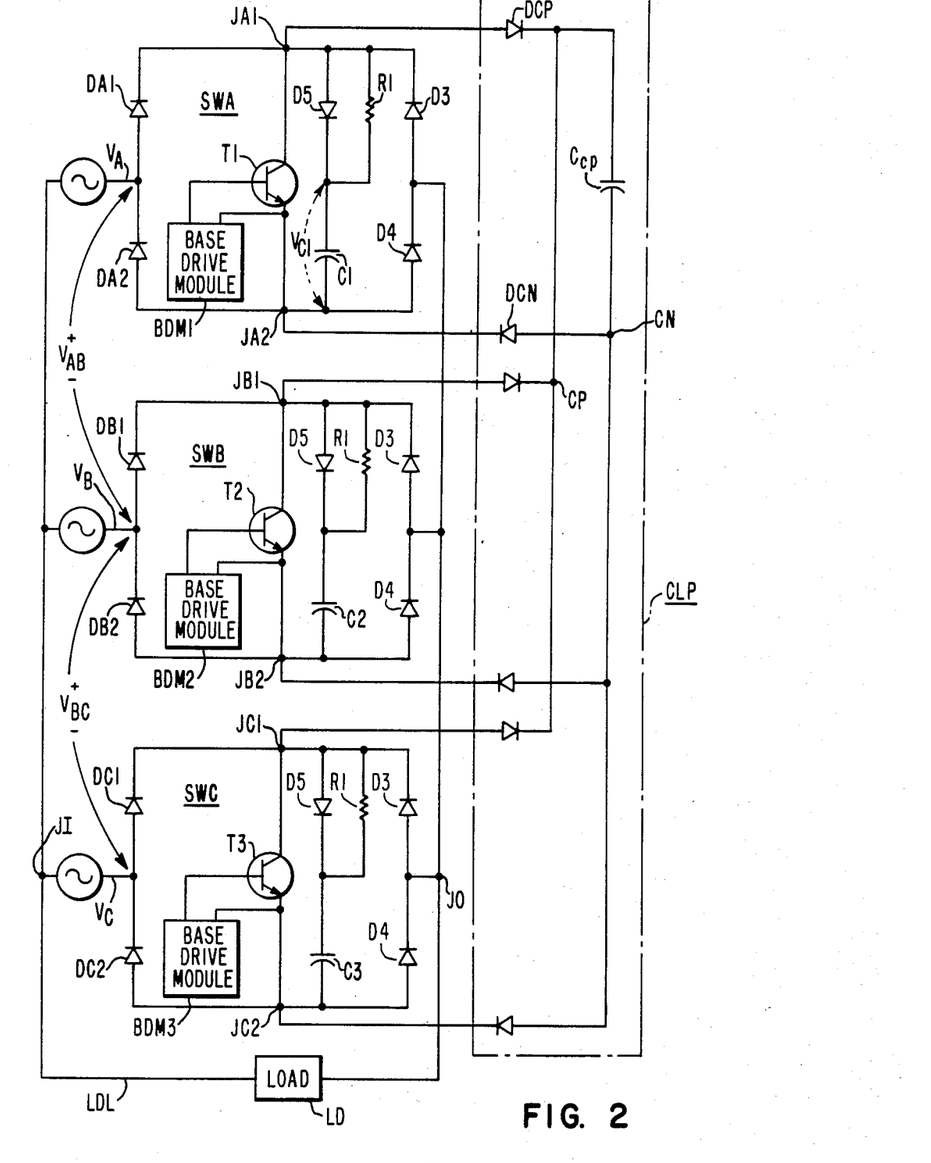
FIG. 2 shows a direct AC/AC converter embodying the clamp circuit capacitor circuitry according to the present invention.

FIG. 2 shows three bilateral switches, like the one in FIG. 1, connected between the three phase lines $V_A$, $V_B$, $V_C$, respectively, of the input supply, and the load, at common point J0. The load LD is shown schematically connected between junction J1 (the supply neutral) and junction J0. Each switch has its own base drive module, BDM1, BDM2, and BDM3, respectively, to control the associated bipolar transistor (T1, T2, or T3). The snubber circuits associated with each transistor include a capacitor (C1, C2, C3 in the respective cases).

Figure 2A:
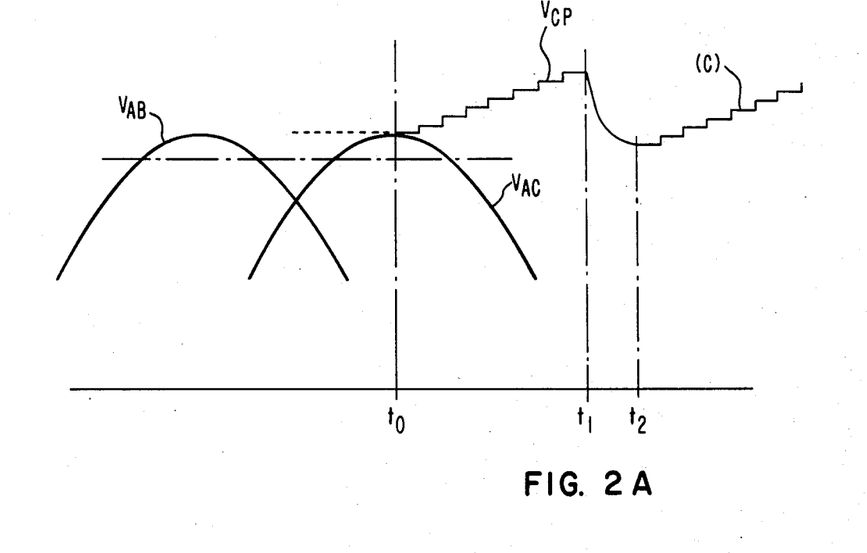
FIG. 2A illustrates with curves the voltage buildup by the direct AC/AC converter of FIG. 2.

The three-phase matrix converter of FIG. 2 is provided with a voltage clamp circuit built around a common capacitor $C_{cp}$ which is connected through steering diodes DCP, DCN, with the respective poles of the associated bilateral switch: JA1, JA2; JB1, JB2; and, JC1, JC2 for SWA, SWB, and SWC, respectively. Thus, the positive terminal of $C_{cp}$ is CP derived from JA1, JB1, or JC1, via respective diodes like $D_{cp}$, whereas the negative terminal of $C_{cp}$ is CN derived onto JA2, JB2, or JC2, via a diode like $D_{cn}$ in each case. Although FIG. 2 shows a three-phase input single-phase output converter, other topologies can be used involving more phases, line-to-line voltages, and other load configurations, with a common voltage clamp circuit as shown. The operation of the capacitor $C_{cp}$ is illustrated in FIG. 2A.

The clamp capacitor, $C_{cp}$, will always charge to a minimum voltage equal to the peak line-to-line voltage of the supply under the action of rectifiers DA1, DA2, DCP, DCN in association with the switch SWA, of the corresponding devices in association with switch SWB, and similarly for switch SWC. This effect is independent of converter operation.

When switch SWA is conducting, a typical current path exists from voltage $V_A$ through diode DA1 to nodal point JA1, through transisitor T1, then to nodal point JA2, through diode D4 to junction J0, and through the load to junction JI. When transistor T1 is turned OFF, the load inductance will divert current from T1 through D5 and C1. Then, C1 will charge up according to:

$$\Delta V = (I/C1)\Delta t,$$

where current I is assumed constant during the interval $\Delta t$. When the voltage on capacitor C1 reaches the voltage on the clamp capacitor, $C_{cp}$, current will be diverted into the clamp capacitor, $C_{cp}$. The current path at this point becomes as follows: $V_A$ through DA1 to JA1, through DCP, $C_{cp}$, DCN to Junction JA2, through D4 to junction J0, and through the load to junction JI. Since the clamp capacitor $C_{cp}$ can be made as large as necessary without adverse effects in the circuit (unlike the snubber capacitor C1), the change in voltage $\Delta V$ from this point on can be made small since $$\Delta V = (I/C_{cp})\Delta t.$$

When the next switch to conduct (either SWB, or SWC) is turned ON, current is diverted out of the clamp circuit through the load. The above-described action is repeated upon every subsequent switch turn-OFFs, provided the load current is large enough to charge the snubber capacitor up to the clamp voltage during the time interval defined between one switch being turned OFF and the subsequent switch being turned ON.

At very low load circuits an additional mechanism manifests itself by which energy is delivered into the clamp capacitor. Assuming a current path as previously stated, namely through transistor T1 of SWA, when transistor T1 is turned OFF the load current will be diverted, as stated before, into diode D5 and capacitor C1. If the load current is sufficiently low, transistor T2 may be turned ON before capacitor C1 has time to acquire enough voltage to divert current into the clamp. If at this time the voltage VAB is greater than the voltage on capacitor C1, the following occurs (1) Current will flow along a path going from $V_A$ through DA1 to JA1, through D5 and C1 to JA2, through D4 to J0, and through the load to JI.

(2) An additional current path will be formed from VA through DA1 to JA1, through D5 and C1 to JA2, through D4 to J0, through D3 of SWB to JB1, through T2 to JB2, through DB2 and $V_B$ to JI. Such current will be controlled by the parasitic inductance of the loop, and by the difference ($V_{AB}$–$V_{C1}$). This is an underdamped resonant circuit, and capacitor C1 can potentially charge up to $2V_{AB}$. However, when the voltage $V_{C1}$ on capacitor C1 reaches the voltage on the clamp capacitor $C_{cp}$, this current will be diverted into the clamp capacitor as before.

In the absence of the common recovery clamp capacitor $C_{cp}$, the problem of storing energy accumulated in the inductive circuit of each switch would require a much larger local capacitor on each snubber circuit. This approach would entail a larger dissipation in the associated resistor.

In contrast, the common clamp circuit according to the present invention allows the use of a smaller local capacitor with each switch while the clamp capacitor is operating in common, without at any time having the voltage going below the peak voltage applied on the switches. Moreover, as explained hereafter, the energy accumulated in the common circuitry can serve as a common auxiliary source or power supply in the system. Such auxiliary source is allowed to gain an increased voltage, never below the peak voltage, and it is discharged, asynchronously, synchronously, or under the use made of it as an auxiliary voltage source within the overall system. Indeed, in order to be able to absorb the energy released by the several switches under commutation, capacitor $C_{cp}$ must not be fully charged. Accordingly, provision is made for removing the stored enrgy, thereby making the clamp effective again. This is effected in two ways, as illustrated by FIGS. 3 and 4 hereafter.

Figure 3:
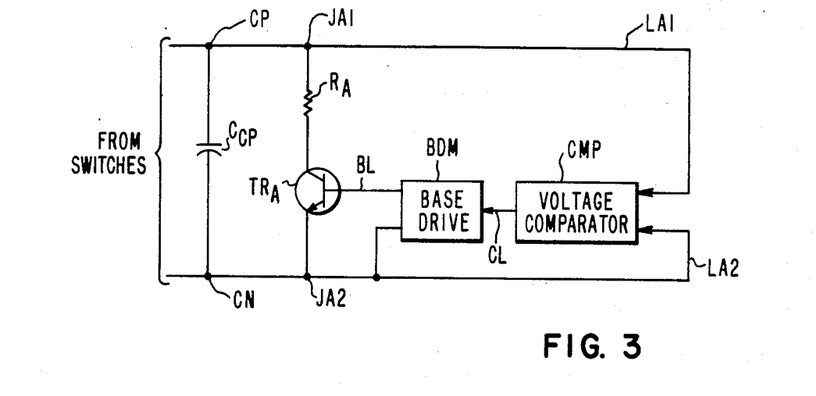
FIG. 3 relates to one embodiment of the invention, wherein the common capacitor of FIG. 2A is being discharged periodically.
Figure 4:
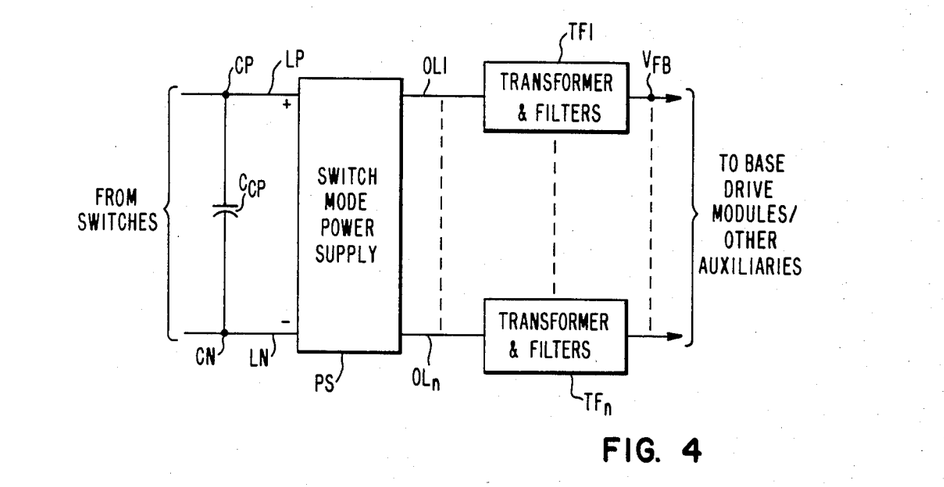
FIG. 4 relates to another embodiment of the invention wherein the energy accumulated in the common capacitor of the clamp circuit of FIG. 2 is used as an auxiliary energy source.

Referring to FIG. 3, the excess capacitor voltage is dissipated through a resistor $R_A$. To this effect, a switch, typically a transistor TRA is connected in series with resistor $R_A$ across the terminals CP, CN of capacitor $C_{cp}$. A voltage comparator CMP having an upper and a lower threshold responds to the voltage $V_{cp}$ derived from lines LA1 and LA2. When (time t1 on FIG. 2A)

the voltage $V_{cp}$ exceeds the upper threshold, comparator CMP generates a control signal on the line CL to trigger the base drive BDM of transistor TRA which, then, becomes conducting and dissipates the energy through resistor RA, thereby bringing the voltage $V_{cp}$ back to an operative level. Transistor TRA is turned OFF again, once the response is beneath (time t2 in FIG. 2A) the lower threshold of comparator CMP. For a given flow of power into the clamp circuit, altering the threshold levels will change the operative frequency of transistor TRA. It is a matter of design to select the recurrence of relaxation instants such as $t_1$, $t_2$ in FIG. 2A.

This embodiment of the invention has several advantages. The peak voltage appearing on the switching devices (T1 with SWA, T2 with SWB, T3 with SWC) can be held to within a small amount above the peak line-to-line voltage. The snubber capacitors (C1, C2, C3) need only be large enough to manage local overvoltage transients and/or dv/dt. The minimum conduction time of SWA, SWB, or SWC can be reduced by reducing the time constant ($R_1C_1$, $R_2C_2$, or $R_3C_3$) of the snubber circuit.

FIG. 4 relates to an alternative embodiment of the invention, wherein the energy accumulated in the common clamp capacitor is recovered and used to power auxiliary circuits in the converter.

The base or gate drive modules associated with the switching devices (T1, T2, T3) in the bilateral switches (SWA, SWB, SWC) have been using power from the main input lines. With a standard frequency of 60 Hz, when using a voltage directly transformed to provide power, the transformers and filter components become very large. For this reason, a switch-mode power supply (PS in FIG. 4) energized with DC power has been preferred as an auxiliary source of power. Such a supply may operate directly off the waves, for instance from a 230-volt system. The waves are full-wave rectified. The resulting DC-link is fed to a high frequency (20 kHz or higher) inverter. Separate transformers and filters are provided for each base, or gate drive module (BDM1, BDM2, BDM3). At 20 kHz or higher, these components can be very small. A switch-mode power supply (PS) is shown in block diagram on FIG. 4. This is a well-known technology using components readily available. In FIG. 4, a practical implementation is shown with the associated control circuit, as explained hereinafter. The switch mode power supply PS of FIG. 4 receives on lines LP, LN from the clamp circuit pole terminals CP, CN, the DC voltage $V_{cp}$. The high frequency output is applied on lines OL1 to OLn to the respective base drives (BDM), or other auxiliaries in the system, via respective transformers and filters.

Figure 5:
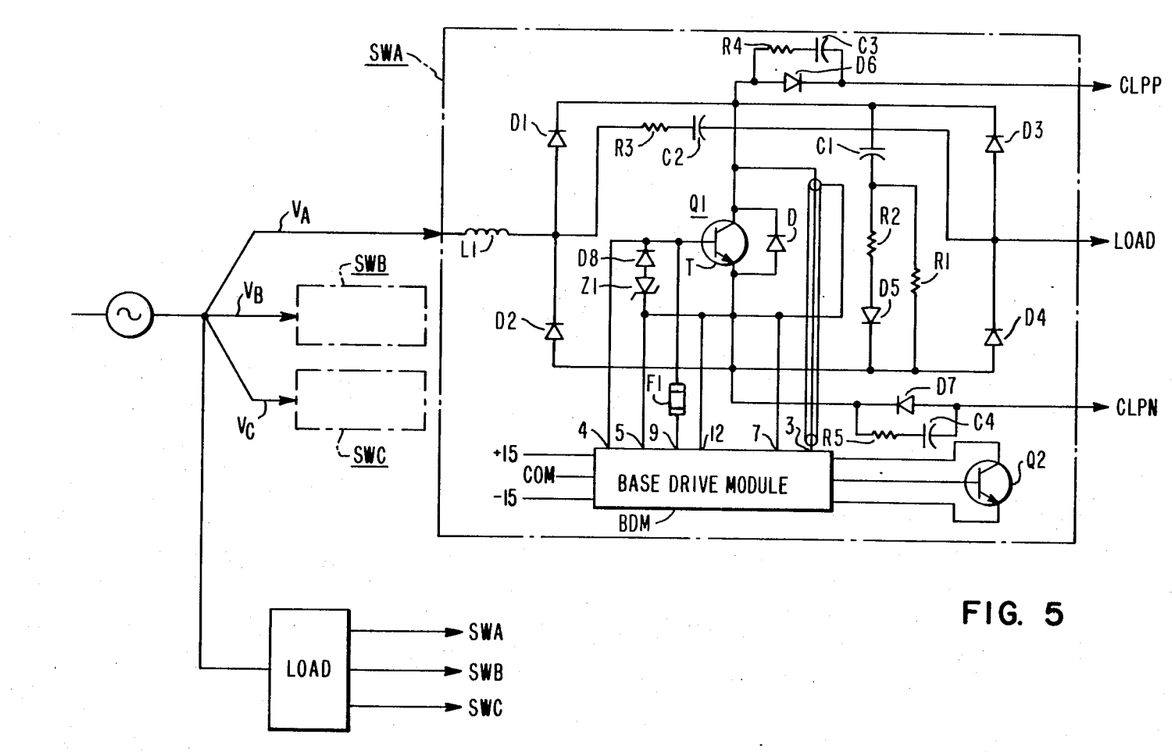
FIG. 5 is a detailed representation of the AC/AC converter used in the preferred embodiment.

FIG. 5 illustrates a practical realization of a bilateral switch SWA inserted in a circuit, as shown in FIG. 2.

Q1 is the central switch (like T1 on FIG. 2) and the snubbers, and individual filter and inductor components are identified in real value, as follows:

| D1,D3 | I.R. 70HFL100S05 |
|---|---|
| D2,D4 | I.R. 70HFLR100S05 |
| D5,D7 | Semikron SKRIM20/12 |
| Q1 | Mitsubishi QM300HA-2H |
| L1 | Inductor 2 $\mu$HY |
| C1-4 | Capacitor 0.1 $\mu$F. 1000 V |
| R1 | Resistor 30 OHM. 25 W |
| R2 | Resistor 2 OHM. 25 W |
| R3 | Resistor 15 OHM. 25 W |
| R4,5 | Resistor 2.5 OHM. 10 W |
| D6 | Semikron SKN3F20/10 |
| Z1 | 1N4734A (5.6 V) |
| D8 | 1N4933 |
| F1 | Fuse 6A |
| Q2 | 2N3055 |

The functional character of the afore-listed components is as follows:
D1 through D4—Bridge Rectifiers for AC switch
Q1—Controllable element of AC switch
L1—Limits turn on losses in Q1, and reverse recovery loss in D1–D4
C1—Snubber capacitor for Q1—Reduces turn-off loss and peak voltage on Q1—This capacitor is reduced in size or may be eliminated.
D5—Steering rectifier for the snubber. This rectifier allows C1 to charge through a low impedance (R2) and to discharge through a high impedance (R1) thereby reducing turn-on loss in Q1.
R2—Optional damping resistor
R1—Snubber capacitor (C1) discharge resistor
R3, C2—Optional snubber for rectifiers D1–D4
D8, Z1—Overvoltage protection for Q1 base-emitter
F1—Optional fuse
Base Drive Module, Q2—Standard type drive module for power darlingtons. Q2 is an integral part of the module, but is located remotely for convenience.

The above-listed components represent prior art. Herebelow are components added in accordance with the invention:
D6–D7—Steering Rectifiers. After the charging of snubber capacitor C1, these rectifiers divert current flowing through the AC switch into the clamp.
C3,C4,R4,R5—Optional snubber network for D6–D7.

With regard to the base drive module BDM, the pins are identified as follows:

(a) Pins 9–12 Thus provide the on and off drive to main transistor Q1. Current flows from pin 9 through the base-emitter junction of Q1 to turn on and maintain Q1 on. The return for the current is through pin 12. When Q1 is to be turned off, the current path is reversed so as to remove the stored charge in Q1. This path, then, goes from pin 12 through the Q1 emitter-base junction while returning through pin 9. Once the stored charge has been removed from Q1, the latter will turn-off. At this point the main turn-off current from the base drive module ceases, and the base drive module applies −5 volts at pin 9 with respect to pin 12 to main Q1 off.

When the base-emitter junction of Q1 recovers, a transient voltage could develop across the base-emitter. This voltage is clamped at a safe level (about 6.5 volts) by Z1 and D8, thus protecting Q1.

(b) Pins 4–5 monitor the status of the base-emitter junction of Q1. When Q1 is turned off, a finite time (typically 5–10 $\mu$sec) may elapse before the stored charge is removed and the current is interrupted. During the time the stored charge is being removed, the voltage across Q1 base-emitter is quite low. At the end of the storage time, the junction could block the voltage and it will rise to its final value of −5 volts. (Since the voltage may overshoot this value, a clamp—Z1, D8 is provided).

The voltage is sensed by circuitry within the Base Drive Module. At the time of detection, a signal is sent to the control circuit (not shown in the figure, since this is not relevant to the invention).

(c) Pins 3-7 They serve to monitor the collector-emitter voltage of the transistor Q1. During normal circuit operation, whenever Q1 is on, the collector-emitter voltage of Q1 should be less than 2.5 volts. Q1 is saturated under these conditions. If Q1 should come out of saturation, as would happen in case of base drive failure or overcurrent, this fact is characterized by a rise in the collector-emitter voltage. If the collector-emitter voltage exceeds 7.5 volts (as measured at pins 3-7 when Q1 is supposed to be on), action will be taken to turn Q1 off. This action is purely protective, and will not occur under normal operating conditions.

Q1 consists of a transistor and diode in a common package connected as shown. The diode is not needed, not used, and has no effect on the circuit operation.

The base drive module is interfaced to the control section by two fiber-optic links. One link carries information from the control circuit regarding the action to be taken by the base drive module, thereby indicating for the base drive module when to turn on Q1, and when to turn off Q1. Such actions are determined by the control circuit in accordance with the particular operating strategy chosen for the power converter.

The second link carries information from the base drive module to the control circuit regarding the status of the base-emitter junction of Q1, as monitored by pins 4-5 of J1 of the base drive module.

The main function of the base drive module used is to turn-on and off Q1 and to monitor base-emitter voltage (J1 pins 4-5) and collector emitter voltage (J1 pins 3-7). The base drive operation for switching transistors is more generally described in "Westinghouse Silicon Power Transistor Handbook", © 1967 by Westinghouse Electric Co., Chapter 4.

Under normal operation there are only two conduction paths through the switch from the input side ($V_A$) to the output side (LOAD). One path (through which positive current is delivered to the load) is through L1, D1, Q1, and D4. The other path (through which negative current is delivered to the load) is through L1, D2, Q1, and D3. Whenever the voltage $V_A$ is to be applied to the load, the Base Drive Module (BDM) turns Q1 on. The current then can be of either polarity, as noted above, and the voltage $V_A$ becomes applied to the load. Any voltage on capacitor C1 prior to the turn on of Q1, is rapidly discharged by the path (C1, Q1 and R1) when Q1 is turned on. This operation does not affect the external circuit. The purpose of R1 is to limit the peak value of this discharge current. When it is no longer desireable to apply $V_A$ to the load, the Base Drive Module (BDM) turns off Q1 by applying reverse current to its base-emitter junction. Diode D8 and Zener diode Z1 provide transient voltage protection on the base-emitter junction of Q1. When the current in Q1 is extinguished, it is diverted from Q1 first into the local snubber consisting of C1, R2, D5. Capacitor C1 reduces the rate of rise of voltage on Q1, thus reducing energy loss in the device as well as protecting it against damaging overvoltages. R2 provides damping for the resonant circuit formed by C1 and L1. D5 provides a steering path for current, forcing the discharge of C1 to occur through R1, and not R2. As R1 can be made significantly larger than R2, the turn-on loss in Q1 is reduced by reducing the peak current at turn-on. When capacitor C1 charges up to the clamp threshold voltage, current will be diverted from the snubber to the clamp through D6, into the clamp, and through D7, from the clamp. Since the clamp capacitor is large, there will be no significant voltage increase across Q1 during the remainder of the commutation period. Load current will continue to flow through L1, and either D1 or D2, plus D6, the clamp capacitor, D7, either D4 or D3, then to the load, until it is picked up by some other switch. L1 is a relatively small inductor having the purpose of limiting reverse recovery currents in diodes D1, D2, D3 and D4, and limiting turn-on in Q1. R3 and C2, R4 and C3, and R5 and C4 are snubbers for diodes D1 through D4, D6, and D7, respectively.

Figure 6A:
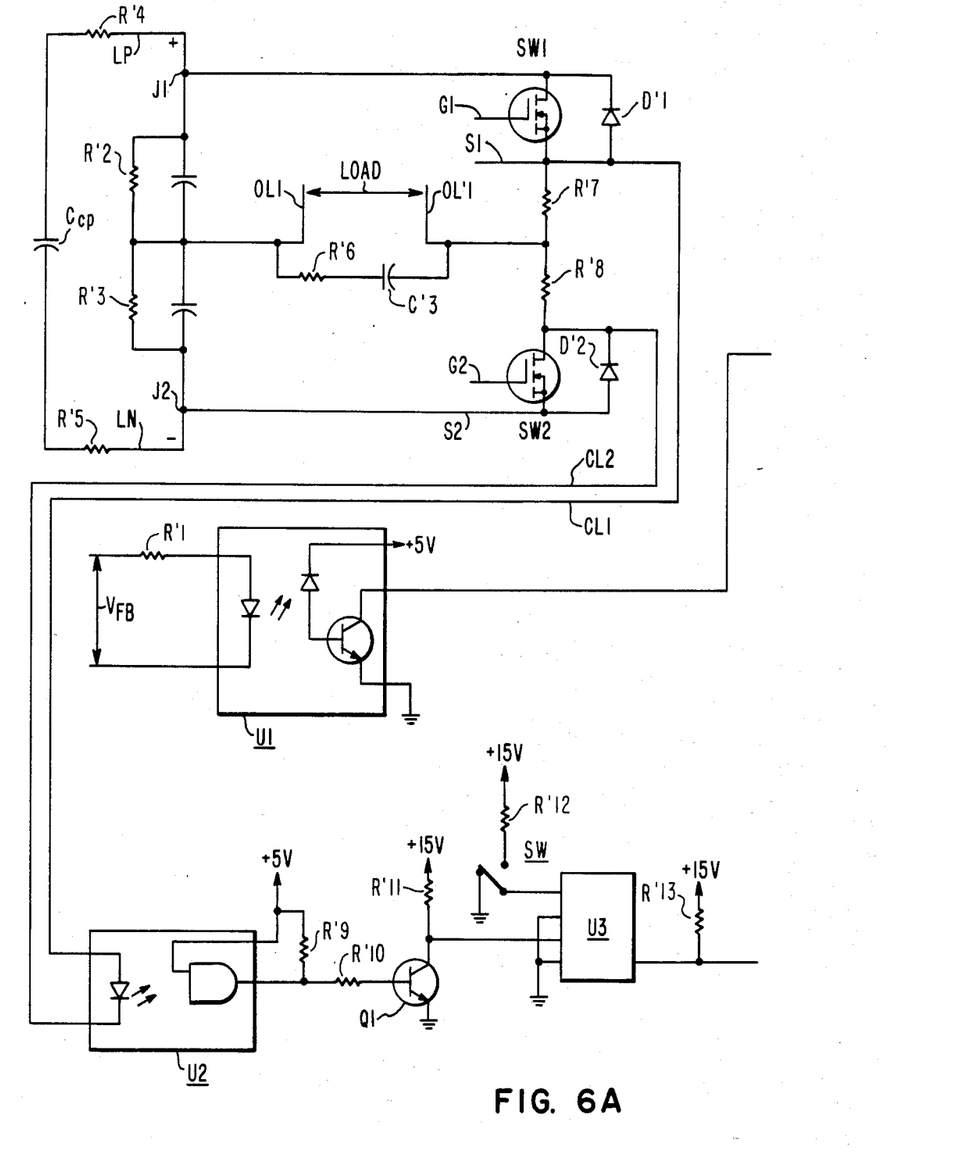
FIGS. 6a and 6b are a detailed representation of the auxiliary energy source of FIG. 4, according to the present embodiment.
Figure 6B:
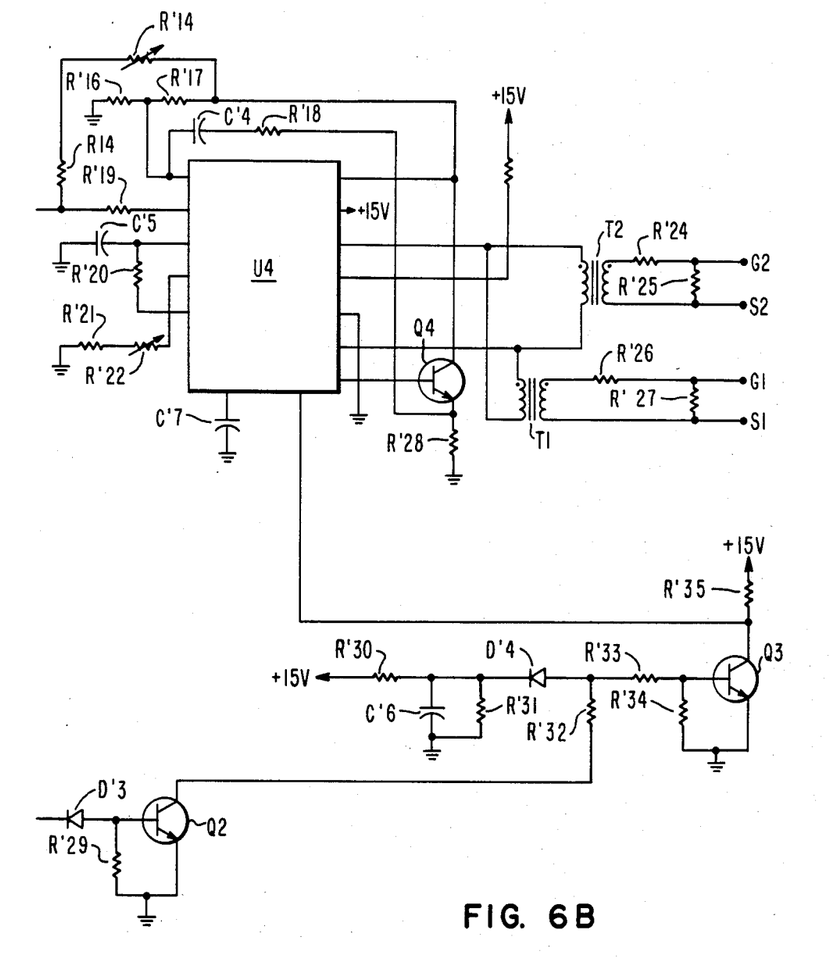

FIGS. 6A, 6B show a practical realization of the energy recovery circuit of FIG. 4. OL1, OL′1 in FIG. 6A are like are like in FIG. 4 the output lines to one of the auxiliaries to be served.

The components used in the circuit of FIGS. 6A-6B are as follows:

---

$C_{cp}$ - Clamp Capacitor
R4, R5 - 0.1 Ω - Resistors for noise filtering
C1, C2 - 330 μf - Capacitors in half bridge
R2, R3 - 300K, 2 W - Balancing resistors
SW1, SW2 - Field Effect Transistors Motorola MTM6N60 - half bridge transistors
D1, D2 - International Rectifier 40S26 - Antiparallel rectifiers for SW1, SW2
R7, R8 - 0.1 Ω, Sense resistors for overcurrent protection
R6 - 27r  ⎫
          ⎬ Snubber
C3 - 2200 pf  ⎭
U4 - Texas Instruments SG3525A PWM Controller
T1, T2 - Gate Pulse Isolation Transformer
R24, R26 - 10 Ω - Gate current limiting resistor
R25, R27 - 470 Ω - Gate protection resistor
R23 - 200 Ω - Gate drive current limiting resistor
CN - 10 μf - Soft Start capacitor
R21 - 5.11K
R22 - 5K (ADJ)            Components to set oscillating
R20 - 200 Ω               frequency and deadband
C5 - 4700 pf
R16, R17 - 5.11K          Sets voltage reference
R1 - 2K
U1 - HCPL - 2502          Sets and isolates voltage feedback
R14 - 1K (ADJ)
R15 - 499 Ω
R19 - 178K
R18 - 1K                  Voltage regulator compensation
C4 - 0.22 μf
Q4 - 2N2222               Internal Amplifier buttering
R28 - 10K
R30, R31 - 7.5K
R33 - 1K
R34 - 5.11K
R35 - 10K                 This circuit provides shutdown
C6 - 4.7 μf               for undervoltage and/or overcurrent
D4 - 1N4733A (ZENER)
Q3 - 2N2222
U2 - HCPL - 2601
R9, R10, R11 - 1K         Overcurrent detection
Q1 - 2N2222
U3 - MC14013 (½)
R12 - 10K                 Provides latch and reset for
SW - Switch               overcurrent signal
R13 - 15K
R29 - 5.11K
R32 - 1K                  Interfaces overcurrent signal to
D3 - 1N4735A (ZENER)      shutdown circuit.
Q2 - 2N2222

---

Control is applied by lines G1, G2 and S1-S2 to switches SW1, SW2 which, at a high frequency, perform the inverting function upon the DC link of lines LP, LN to generate on lines OL1, OL′1 a power supply, which via transformer and filters (TF1, or TF$_n$ in FIG. 4) serve the auxiliaries.

Switches SW1, SW2 are MOSFET devices identified on the market as MTM 6N60, each provided with an antiparallel commutator diode, a non-inductive circuit being mounted across the central node of the single pole inverter so constituted. The control circuit applies to the gates of the devices, the alternating gating signal required at, say, 20 kHz.

FIG. 6B, read in combination with FIG. 6A, shows a pulse-width modulation regulator U4 (sold by Texas Instrument as 3527-A) which by G1, S1 and G2, S2 generates the gating pulses of the switches SW1, SW2 of FIG. 6A. On FIG. 6A is shown how the voltage feedback V$_{FB}$ (derived from the circuit of FIG. 4) for this particular auxiliary is coupled through a device U1, which is a Hewlett-Packard HCPL-2502 (for optical isolation) in controlling device U1 of FIG. 6B.

FIG. 6A also shows at U2 another optical isolation provided by a Hewlett-Packard HCPL-2601 for overcurrent protection. U3 on FIG. 6A is a flip-flop (4013).

FIGS. 6A, 6B show a standard "Half-Bridge" converter. The power conversion stage consists of capacitors C1 and C2, MOSFETS SW1 and SW2, and antiparallel rectifiers D1 and D2. Resistors R4 and R5 help suppress transients; resistors R2 and R3 provide voltage sharing for capacitors C1 and C2; resistors R7 and R8 provide current sensing; resistor R6 and capacitor C3 form a snubber.

U4 is a regulating pulse-width-modulator control circuit, Texas Instruments SG3525A. Resistors R20, R21, and R22 and capacitor C5 provide trimming for the timing functions of U4. Resistors R16 and R17 provide the voltage reference for the regulator. The voltage feedback for the regulator is derived from one of the output lines, isolated by optocoupler U1, and converted to the proper level by resistors R14, R15, and R19. The error amplifier internal to U4 is compensated by capacitor C4 and resistor R18, and buffered by emitter follower Q4 and R28. U4 provides, as output, drives for the MOSFETS SW1 and SW2. Resulting signals are first isolated by transformers T1 and T2. Resistor R23 limits current through the transformers, and resistors R24, R25, R26, and R27 provide voltage attenuation. Capacitor C7 provides for an orderly startup of U4 at power up.

Undervoltage shutdown and overcurrent shutdown is provided by Q3, appropriately interfaced to U4. The resistor-diode-capacitor network at the base of Q3 provides detection of undervoltage. Overcurrent is sensed across R7 and R8, and detected and isolated by optocoupler U2. The overcurrent signal is then buffered by Q1, latched by U3, and interfaced to shutdown transistor Q3 by Q2.

I claim:

1. In a matrix converter for directly converting AC power from an AC supply to an AC load including a plurality of bilateral switches connected on respective AC phase lines, the combination of:

a common capacitor connected between opposite pole ends of each of said bilateral switches through corresponding diode means, for deriving from said pole ends current under substantially constant DC voltage; and means connected across said common capacitor for dissipating energy accumulated in said common capacitor.

2. The matrix converter of claim 1 with said energy dissipating means including resistor means, control means being provided operative at a predetermined maximum voltage level upon said common capacitor for connecting said resistor means across said common capacitor, thereby to dissipate said derived energy therethrough.

3. The matrix of claim 2 with said control means including unilateral switching means connected in series with said resistor means across said common capacitor, and voltage comparator means responsive to the voltage buildup upon said common capacitor, said voltage comparator means being operable to close said unilateral switching means when said predetermined maximum voltage level is exceeded.

4. The matrix converter of claim 1 with means connected across said common capacitor for recovering energy therefrom, and means responsive to said energy recovering means for providing auxiliary energy for said matrix converter;

energy dissipating means being provided operative with accumulated energy in excess of energy derived by said energy recovering means.

5. The matrix converter of claim 4, with said energy recovering means including inverter means operative with said common capacitor voltage for generating AC voltage at a high frequency as a vehicle of said auxiliary energy.

* * * * *